United States Patent

Fukumitsu

[11] Patent Number: 4,468,764
[45] Date of Patent: Aug. 28, 1984

[54] DISC REPRODUCING APPARATUS

[75] Inventor: Akira Fukumitsu, Fukaya, Japan

[73] Assignee: Tokyo Shibaura Denki Kabushiki Kaisha, Japan

[21] Appl. No.: 423,724

[22] Filed: Sep. 27, 1982

[30] Foreign Application Priority Data

Dec. 17, 1981 [JP] Japan .............................. 56-202425

[51] Int. Cl.³ .......................... G11B 21/02; G11B 9/06; G11B 23/04; G11B 3/36
[52] U.S. Cl. .................................... 369/77.2; 369/221
[58] Field of Search ...................... 369/77.2, 219, 220, 369/221, 262, 264

[56] References Cited

FOREIGN PATENT DOCUMENTS 2098377 11/1982 United Kingdom ............... 369/77.2

Primary Examiner—Steven L. Stephan
Attorney, Agent, or Firm—Cushman, Darby & Cushman

[57] ABSTRACT

A disc reproducing apparatus comprises a turntable which is vertically movable between an upper position in a reproducing condition and a lower position in a nonreproducing condition; a cartridge which is movable between a reproduction start position and a reproduction end position; cartridge driving mechanism, with a motor, for driving the cartridge from the reproduction start position toward the reproduction end position. The cartridge driving mechanism includes a transmission mechanism which transmits the driving force of the motor to the cartridge when the turntable is located at the upper position, and which does not transmit the driving force of the motor to the cartridge to render the cartridge free to move when the turntable is positioned at the lower position; and a coil spring for urging the cartridge from the reproduction end position to the reproduction start position. The cartridge is returned to the reproduction start position by the coil spring when the turntable is positioned at the lower position.

3 Claims, 14 Drawing Figures

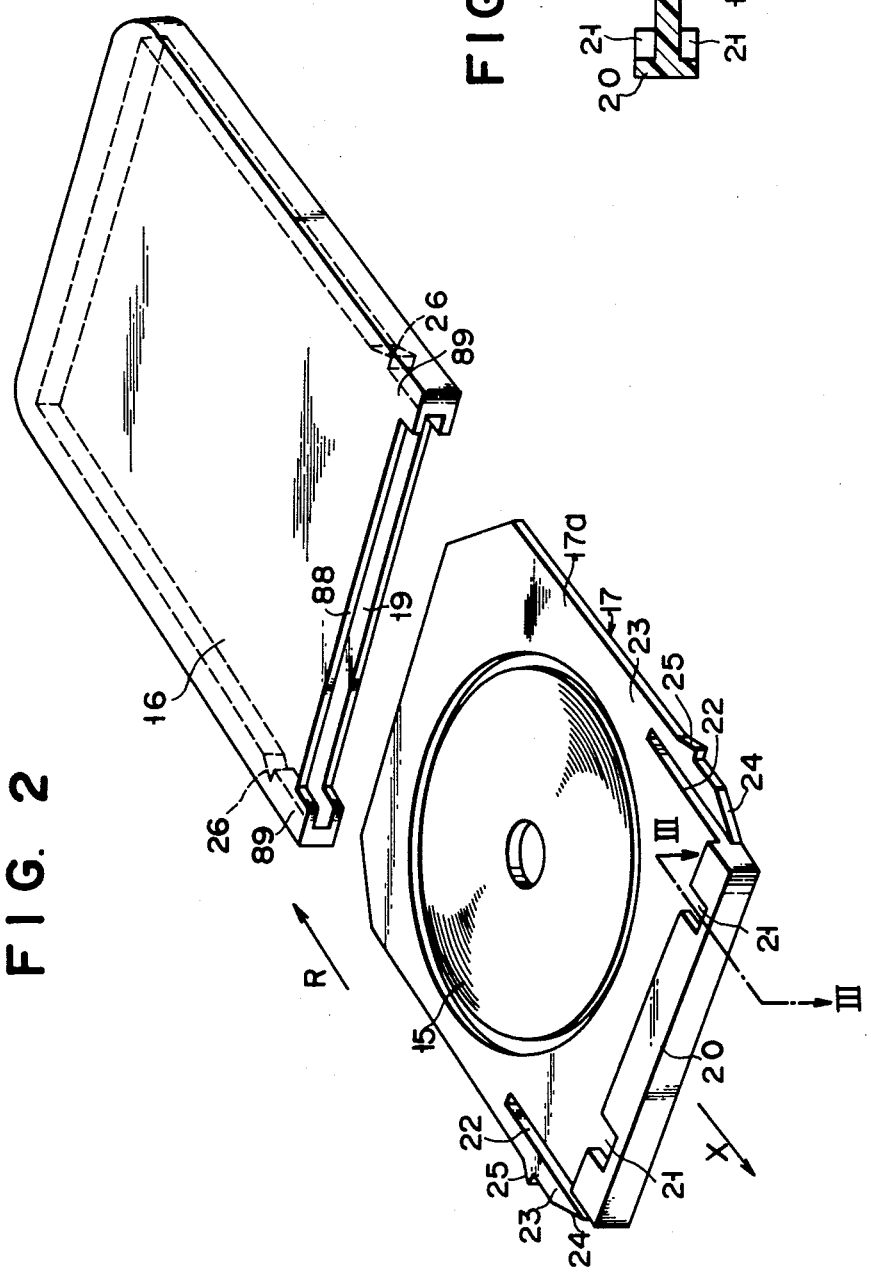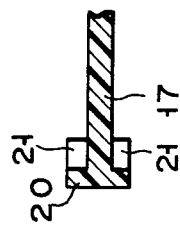

DISC REPRODUCING APPARATUS

BACKGROUND OF THE INVENTION

The present invention relates to a disc reproducing apparatus wherein a disc is inserted into the apparatus by inserting a casing housing the disc therein. The loaded disc may then be removed from the apparatus by inserting the empty casing within the apparatus.

Generally, in a disc reproducing apparatus of this type, a disc, such as a video disc, is placed on a turntable, and information recorded on the video disc is reproduced by bringing a reproducing stylus in contact with the video disc. The information includes video signals and audio signals, and is recorded with very high density according to a PCM (pulse code modulation) recording system. If any foreign matter, such as dust or dirt, sticks to the video disc, therefore, reproduced pictures will be subject to noise. Accordingly, there have been developed various apparatus which enable an operator to set on and remove the video disc from the turntable without directly touching the disc.

Prior to being placed in the turntable, the video disc is housed in a casing opening at one side while it is surrounded by a retaining frame which is locked to the casing. In this state, the video disc is inserted into the reproducing apparatus through one side thereof. When the insertion is completed, the video disc together with the retaining frame, is held within the reproducing apparatus, and the retaining frame is unlocked from the casing. When the casing is drawn out of the reproducing apparatus, both the video disc and the retaining frame are removed from the casing through one side thereof and remain in the reproducing apparatus, so that the casing is emptied. In this state, reproducing operation is started. If the empty casing is inserted into the reproducing apparatus through the one side thereof after the reproducing operation is finished, the video disc, together with the retaining frame, is put into the casing through the one side thereof, and the retaining frame is locked to the casing. Then, if the casing is drawn out of the reproducing apparatus, the video disc and the retaining frame are taken out of the apparatus while they are contained in the casing.

In a disc reproducing apparatus of this type, the cartridge is generally forwarded from the start position in accordance with the rotation of the disc by the driving force of a motor and it is also reversed to the start position by the motor driving force. The reverse movement of the cartridge with this method is time-consuming and immediate reproduction of the next disc or the opposite surface of the same disc may not begin until the cartridge returns to the start position. Immediate reproduction from another disc or the other surface of the same disc may however be accomplished if two motors are incorporated into the apparatus each for driving the cartridge in the forward and backward directions, respectively independently of each other. The functions of the two motor system may alternatively be performed by the use of a reversible motor and a reduction gear mechanism for changing the transmission ratio according to the direction of rotation of the reversible motor. With this arrangement, according to the direction of rotation of the reversible motor, the speeds of the cartridge in the forward and backward directions are different from each other. However, these arrangements result in a complex configuration and high cost of the overall apparatus. Moreover, troubles tend to occur more frequently.

Even if the cartridge can be returned to the start position at high speed by the motor, the cartridge bounces at the start position due to such high-speed movement. This results in deviation of the cartridge position from the start position which causes damage to the stylus or tracking error. For this reason, a holding means for holding the cartridge upon its return movement must be incorporated. The holding means may securely hold the cartridge in position. However, the holding force of the holding means acts as a load on the motor and thus, a high-output motor must be used.

SUMMARY OF THE INVENTION

The present invention has been developed in consideration of the above-mentioned circumstances and is intended to provide a disc reproducing apparatus which allows a cartridge to automatically return to a nonreproducing start position and prevents rebound of the cartridge at the start position.

According to a preferred embodiment of the present invention, there is provided an apparatus for reproducing signals recorded on a disc, comprising a housing; a turntable which is vertically movable in said housing; turntable driving means for moving said turntable to an upper position in a reproducing condition and for moving said turntable to a lower position in a nonreproducing condition; a cartridge which has a stylus for picking up signals recorded on said disc in the reproducing condition and which is movable between a reproduction start position and a reproduction end position; cartridge driving means, with a motor, for driving said cartridge from the reproduction start position toward the reproduction end position, said cartridge driving means including a clutch means which transmits the driving force of said motor to said cartridge when said turntable is located at the upper position, and which does not transmit the driving force of said motor to said cartridge to render said cartridge free to move when said turntable is positioned at the lower position; and urging means for urging said cartridge from the reproduction end position to the reproduction start position, whereby said cartridge is returned to the reproduction start position, whereby said cartridge is returned to the reproduction start position by the urging means when the turntable is positioned at the lower position.

BRIEF DESCRIPTION OF THE DRAWINGS

FIG. 2 is a perspective view showing the video disc together with a casing and a retaining frame;

FIG. 3 is a sectional view of the retaining frame shown in FIG. 2 taken along the line III—III;

DETAILED DESCRIPTION OF THE PREFERRED EMBODIMENT

There will now be described in detail one embodiment of a disc reproducing apparatus according to the present invention with reference to the accompanying drawings.

Figure 1:
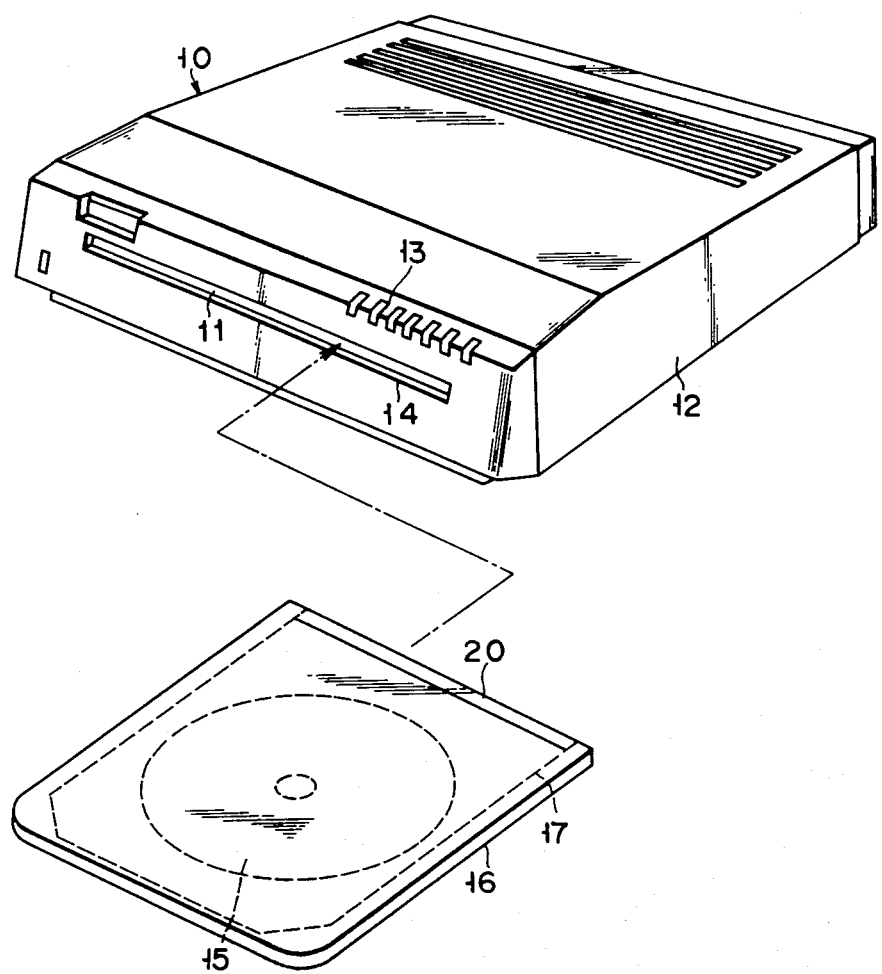
FIG. 1 is a perspective view showing one embodiment of a disc reproducing apparatus according to the present invention together with a video disc.

In this embodiment, as shown in FIG. 1, the disc reproducing apparatus is a video disc player 10 provided with a housing 12. Arranged on the top surface of the housing 12 are plurality of operating buttons 13 for designating various operation modes provided. Provided on the front side face of the housing 12 is a horizontally extending insertion inlet 14 in which a casing 16 is inserted. The housing 12 is provided with a cover 11 operably closing the insertion slot 14. The housing 12 contains a reproducing mechanism (not shown) for reproducing information recorded on a video disc 15.

The video disc 15 is kept in the casing 16 with a retaining frame 17 at all times except when being played in the player 10. Therefore, the video disc 15 is not exposed to the outside, and hence is kept from being soiled by direct contact with a user's fingers.

As shown in FIG. 2, the video disc 15 is disposed in a through hole 18 which has a diameter slightly greater than the diameter of the video disc 15 and is surrounded by the central portion of the retaining frame 17. Thus, the video disc 15 is allowed to move in the horizontal direction with the retaining frame 17, and to move freely in the vertical direction independently of the retaining frame 17. The casing 16 is in the form of a thin box having an access opening 19 in one side face. The video disc 15 is inserted, together with the retaining frame 17, in a direction shown by an arrow R, to the casing 16 through the opening 19.

The retaining frame 17 includes a frame body 17a which is slightly thicker than the video disc 15 and slightly thinner than the height of the opening 19 of the casing 16, and which has the through hole 18 in the center thereof, and a bank portion 20 formed on that side of the frame body 17a which extends at right angles to the inserting direction R and having a thickness substantially equal to the height of the casing 16. Recesses 21 are formed at both end portions of the bank portion 20. The bottom of each recess 21 is flush with the top surface of the frame body 17a. As shown in FIG. 3, the recesses 21 are formed on both top and bottom sides of the bank portion 20. Formed on both sides of the frame body 17a of the retaining frame 17 are slits 22 each extending over a given length from one end along the inserting direction R. Each slit 22 defines an elastic strip 23. An outwardly projecting claw 25 is formed in the middle of each elastic strip 23. The claw 25 is composed of a stop surface at right angles to the inserting direction R and a pressing surface inclined inwardly in the inserting direction R. The outer side face of the tip end portion of each elastic strip 23 is composed of a slant face 24 inclined inwardly in the opposite direction to the inserting direction R.

Stop notches 26 capable of receiving their corresponding claws 25 of the retaining frame 17 are formed on the inner side faces of the casing 16. When the retaining frame 17 is entirely housed within casing 16, both claws 25 are urged into engagement with their corresponding stop notches 26 of the casing 16 by the elasticity of the elastic strips 23, thereby locking the retaining frame 17 to the casing 16. In such a locked state, the bank portion 20 completely blocks opening 19 of the casing 16, thus keeping dust from penetrating into the casing 16 to soil the video disc 15. Since the retaining frame 17 is locked to the casing 16 by the engagement between the claws 25 and the stop notches 26, a user will never be able to manually pull the video disc 15 from the casing 16 by grasping the bank portion 20.

Figure 4:
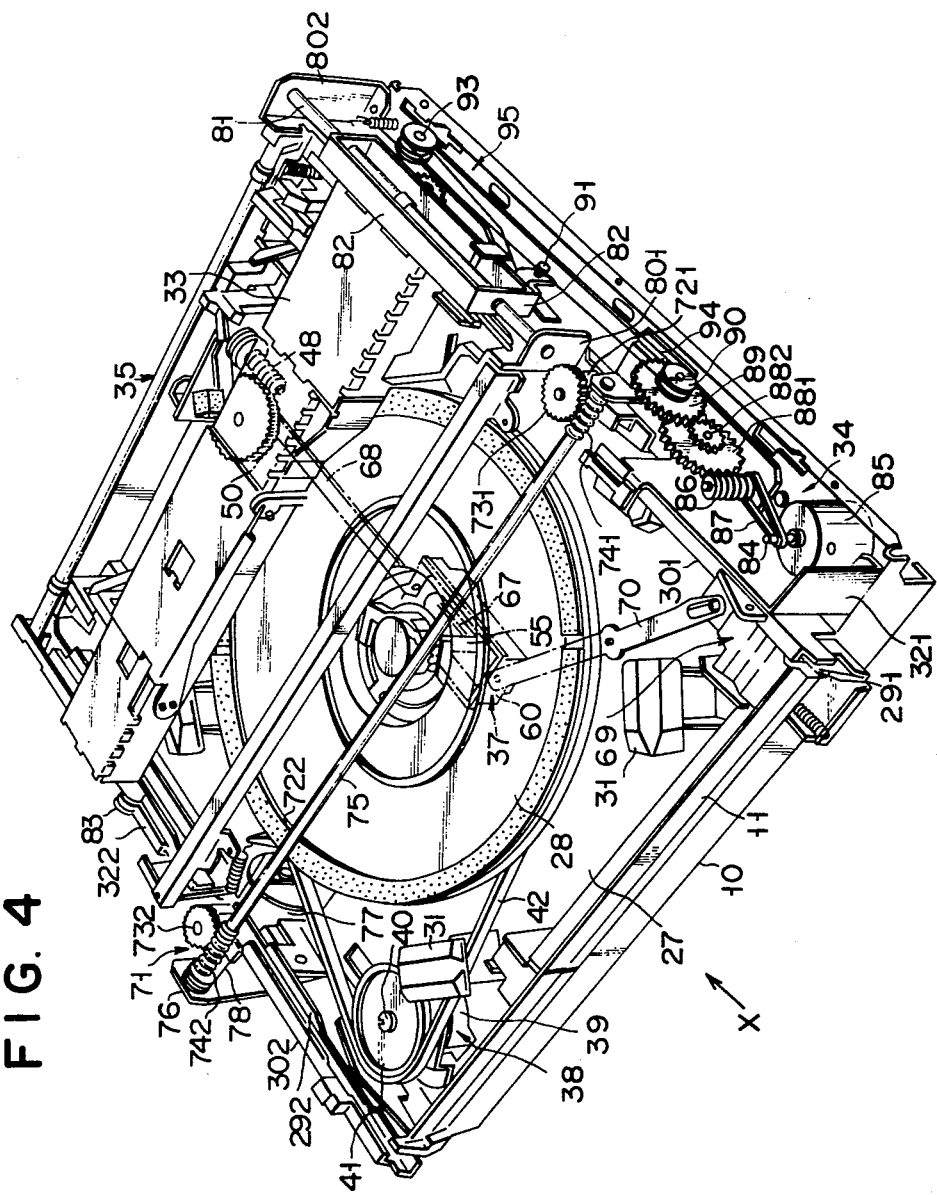
FIG. 4 is a perspective view showing the internal mechanism of the disc reproducing apparatus.

Referring now to FIG. 4, there will be described a guide mechanism for the casing 16 inside the player 10.

As shown in FIG. 4, a horizontally extending chassis 27 is disposed in the housing 12 of the player 10. A turntable 28 with a diameter smaller than that of the video disc 15 is mounted on the chassis 27. The turntable 28 is designed to be moved vertically by a first driving mechanism 37 (described later) and rotated by a second driving mechanism 38 (described later). A pair of guide rails 301 and 302 are fixed on the chassis 27, extending parallel to an inserting direction indicated by a narrow X (opposite to the aforesaid inserting direction R). One end of each of the guide rails 301 and 302 is located at each corresponding end portion of the inserting slot 14 shown in FIG. 1. The guide rails 301 and 302 are each provided with groove portions 291 and 292, respectively, to receive their corresponding side portions of the casing 16, the groove portions having a given distance above the top surface of the chassis 27. The guide rails 301 and 302 are long enough to allow the retaining frame 17 to be entirely housed in the housing 12.

The guide rails 301 and 302 are attached to the chassis 27 by means of a pair of auxilliary chassis 321 and 322, respectively. A cartridge 33 is stretched between the two auxiliary chassis 321 and 322, extending at right angles to the direction of the arrow X. The cartridge 33 is allowed to move along the direction of the arrow X, described in detail later. One auxiliary chassis 322 is fitted with a third driving mechanism 34 (described later) for driving the cartridge 33. The cartridge 33 is fitted with a reproducing stylus (not shown), which contacts a groove on the video disc 15 set on the turntable 28 to pick up audio/video signals recorded on the video disc 15.

Four support members 31 are arranged on the region of the chassis 27 around the turntable 28. These support members 31 support the inner peripheral edge portion of the frame body 17a and the outer peripheral portion of the video disc 15 while the video disc 15 is entirely contained in the housing 12. In the non-operating state, the top surface of the turntable 28 is located below the top surfaces of the support members 31. The top surfaces of the support members 31 are substantially flush with the under surfaces of the groove portions 291 and 292 of the guide rails 301 and 302.

Disposed on that portion of the chassis 27 which faces the other end portions of the guide rails 301 and 302 is a holding device 35 to hold the bank portion 20 of the retaining frame 17. The holding device 35 functions as to unlock the retaining frame 17 from the casing 16 and hold the same when the casing 16 containing the video disc 15 is inserted in the housing 12. The holding device 35 also functions to release the hold of the retaining frame 17 and lock the same to the casing 16 when the empty casing 16 is inserted in the housing 12 for retrieving the video disc 15 from the housing 12 after the reproducing operation is ended.

Figure 5A:
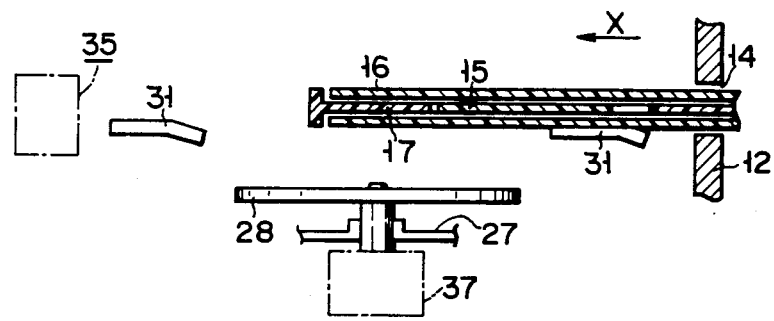
FIGS. 5A to 5C are side sectional views schematically showing the operation modes of a turntable.
Figure 5B:
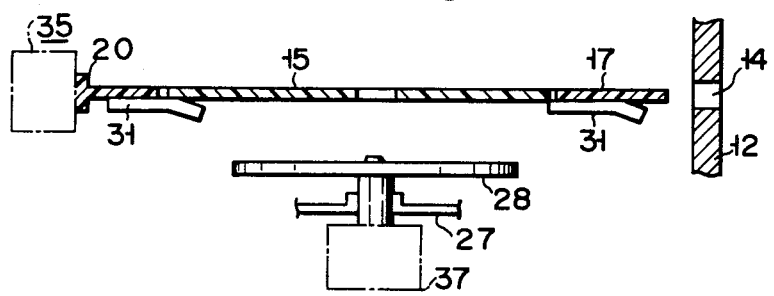
Figure 5C:
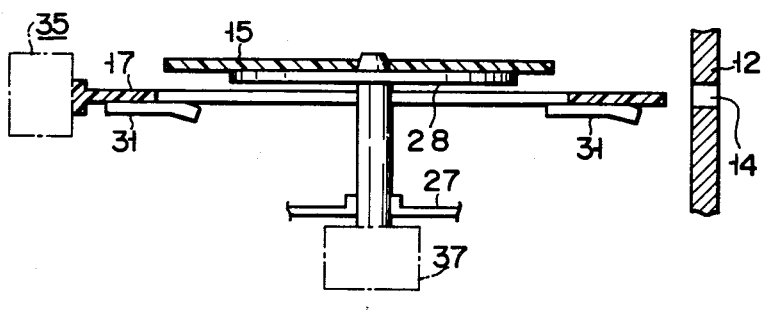

Referring now to FIGS. 5A to 5C, there will be described the manner in which the video disc 15 is inserted.

First, the casing 16 containing the video disc 15 is inserted through the insertion slot 14 into the housing 12. Both side portions of the casing 16 are regulated and guided in inward movement by the respective groove portions 291 and 292 of the guide rails 301 and 302. At this time, the turntable 28 is located below the support members 31, as shown in FIG. 5A, so that the casing 16 can be inserted without hindrance.

If the casing 16 is further pushed in from the position shown in FIG. 5A, the one end portion of the casing 16 abuts against the holding device 35. By the agency of the holding device 35, the bank portion 20 of the retaining frame 17 is stopped, and the casing 16 and the retaining frame 17 are unlocked or disengaged from each other. If the casing 16, in this state, is pulled out, the retaining frame 17, held by the holding device 35, remains within the housing 12, accompanied with the video disc 15, while the casing 16 is emptied and taken out of the housing 12. Accordingly, the retaining frame 17 and the video disc 15 are supported by the four support members 31, as shown in FIG. 5B.

In the state shown in FIG. 5B, if one of the operating buttons 13 is depressed to give instructions for the start of reproducing operation, the turntable 28 first ascends to bear the video disc 15 thereon, and further rises to elevate the disc 15. Thus, the video disc 15 is brought to the position higher than the support members 31, and released from the support thereby, as shown in FIG. 5C. In the state of FIG. 5C, the turntable 28 rotates, the cartridge 33 moves to a predetermined position, and audio/video signals are picked up from the video disc 15 by the reproducing stylus.

When the reproducing operation is completed, the turntable 28 ceases to rotate. Then, the turntable 28 descends to the position shown in FIG. 5B, and the video disc 15 comes to be supported by the support members 31. If, in this state, the empty casing 16 is inserted through the insertion slot 14 into the housing 12 with its one end portion (at which the opening 19 is formed) forward until the one end portion of the casing 16 abuts against the bank portion 20 of the retaining frame 17, then the retaining frame 17 is locked to the casing 16, and the holding device 35 releases its hold of the retaining frame 17. If the casing 16 is pulled out, therefore, the video disc 15 is taken out of the housing 12 while it is housed together with the retaining frame 17 in the casing 16, as shown in FIG. 5A.

The internal mechanism in the housing 12 will now be described with reference to FIG. 4.

A second motor 34 as the second drive mechanism 38 is arranged with its rotating shaft 40 extending vertically. A pulley 41 is coaxially mounted on the upper end of the rotating shaft 40. A belt 42 is stretched between the turntable 28 and the pulley 41. Since the driving force of the motor 34 is transmitted to the turntable 28 through the belt 42, the driving force may be transmitted even if the turntable 28 moves vertically.

Figure 6:
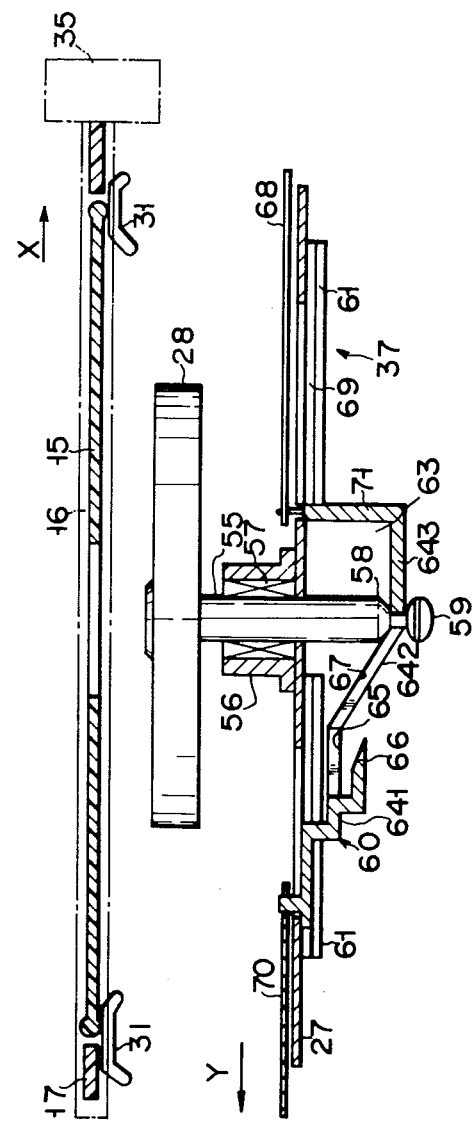
FIG. 6 is a side sectional view showing a first drive mechanism in the nonreproducing condition.
Figure 7:
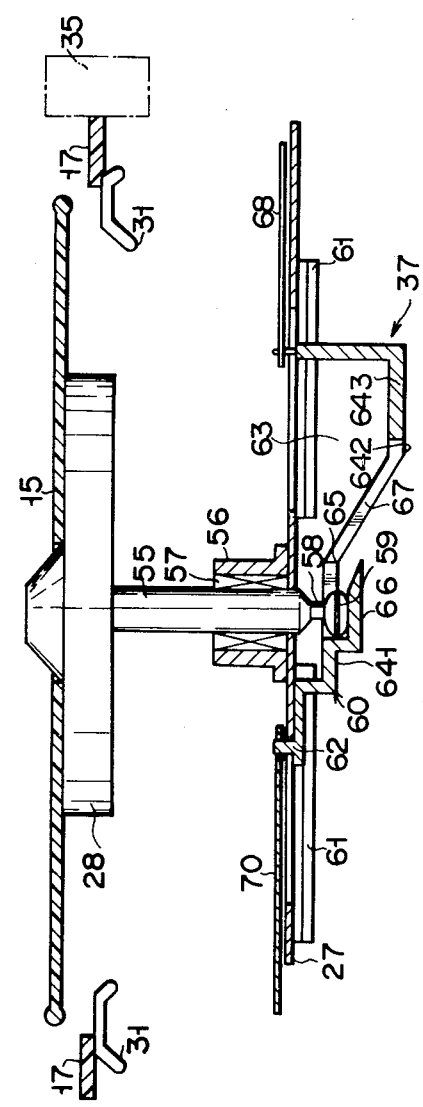
FIG. 7 is a side sectional view showing the first drive mechanism in the reproducing condition.
Figure 8:
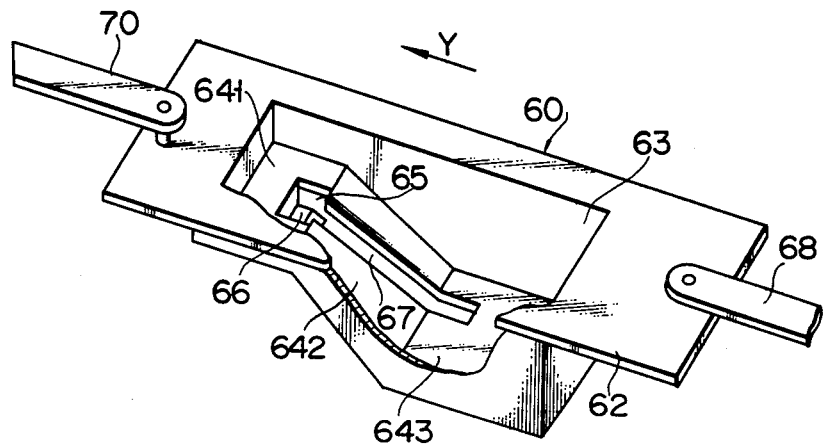
FIG. 8 is a partially cutaway, perspective view of a slider used for the first drive mechanism.

The first drive mechanism 37 regulating the vertical movement of the turntable 28 will be described in detail with reference to FIGS. 6 to 8.

The turntable 28 has a coaxial rotating shaft 55 fixed at its center. The lower end portion of the rotating shaft 55 is located below the chassis 27. The middle portion of the rotating shaft 55 is provided in a receiver 56 mounted on the upper surface of the chassis 27. A bearing 57 allows movement of the rotating shaft 55 about the axis as well as movement along the axis (i.e., vertical movement). An annular groove 58 is formed at the lower end portion of the rotating shaft 55 and a bottom surface 59 of the rotating shaft 55 is formed by a smooth arcuated surface.

The position of the turntable 28 along the axis is defined by a slider 60. The slider 60 is slidably supported by a pair of slider supports 61 mounted at the lower surface of the chassis 27 along the direction shown by an arrow Y. The slider 60 shown in detail in FIG. 8 has a base plate 62. A recess 63 is formed at substantially the center of the base plate 62. The bottom surface of the recess 63 is constituted by a first flat bottom plate 641 having a predetermined depth from the level of the base plate 62, an inclined bottom plate 642 adjacent to the first flat bottom plate 641 increasing inclination downward in a opposite direction to the direction shown by the arrow Y, and a second flat bottom plate 643 adjacent to the inclined bottom plate 642 and having a depth, from the bottom surface of the first flat bottom plate 641, corresponding to the vertical movement of the turntable 28. These plates are arranged in the order named in the opposite direction to the direction shown by the arrow Y.

A large opening 65 is formed at that portion of the first flat bottom plate 641 which is adjacent to the inclined bottom plate 642. A supporting plate 66 which receives the bottom surface 59 of the rotating shaft 55 is mounted at the first flat bottom plate 641. The supporting plate 66 is disposed parallel to the first flat bottom plate 641 and being spaced apart therefrom. The distal end of the supporting plate 66 is tapered in order to receive the bottom surface of the rotating shaft 55.

A groove 67 is formed along the direction shown by the arrow Y in the inclined plate 642 and a part of the second flat bottom plate 643, which is continuous with the opening 65. The width of the groove 58 is smaller than the diameter of the rotating shaft 55 and larger than the diameter of the annular groove 58. The rotating shaft 55 is supported on the slider 60 through engagement of the periphery of the groove 67 and the periphery of the annular groove 58 of the rotating shaft 55 described above.

Figure 9:
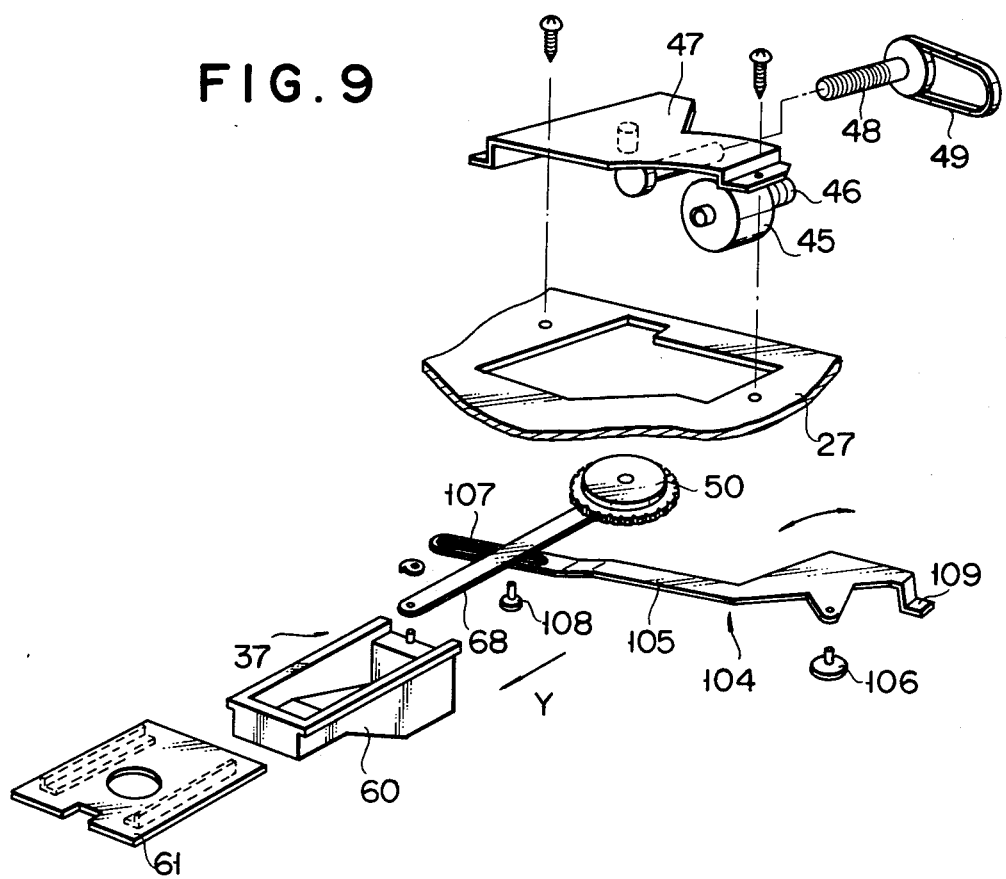
FIG. 9 is an exploded perspective view showing the first drive mechanism together with a control mechanism.

One end of a drive lever 68 is coupled to the rear part of the base plate 62 of the slider 60 at an up stream side along the direction indicated by arrow Y. The other end of the drive lever 68 is connected to a first motor 45. As shown in FIG. 9, the first motor 45 is secured to the chassis 27 by a mount plate 47. A worm 48 is rotatably mounted to this mount plate 47 parallel to a rotating shaft 46. A belt 49 is stretched between the worm 48 and the rotating shaft 46 so as to transmit the driving force of the first motor 45 to the worm 48 through the belt 49. A worm wheel 50 is pivotally mounted to the mount plate 47 to engage in mesh with the worm 48. The rotating axis of the worm wheel 50 vertically extends. The other end of the drive lever 68 is eccentrically and pivotally mounted to the under surface of the worm wheel 50. In the reproducing condition, the other end of the drive lever 68 is located at that portion of the worm wheel 50 which is positioned on opposite side of the slider 60 with the rotating axis of the worm wheel 50 therebetween. In the nonreproducing condition, the other end of the drive lever 68 is moved to the side of the slider 60 with the pivotal movement of the worm wheel 50, that is the slider 60 is moved along the direction opposed to the direction shown by the arrow Y.

The mode of operation of the first drive mechanism 37 of the turntable 25 will be described hereinafter. The operation button 13 is depressed to start reproduction from the nonreproducing condition shown in FIG. 6. Then, the first motor 45 rotates the worm wheel 50 by 180°. By this pivotal movement, the drive lever 68 moves the slider 60 in the opposite direction of the arrow Y. The rotating shaft 55 is guided by the groove 67 and lifted up by the inclined surface of the plate 642. The video disc 15 is lifted up and received by the turntable 28. When the rotating shaft 55 is placed in the opening 65 of the first flat bottom plate 643, the video disc 15 is in its reproducing condition as shown in FIG. 7. The turntable 28 is driven by the second drive mechanism 38.

After reproduction, the second drive mechanism 38 stops driving the turntable 28. The first motor 45 of the first drive mechanism 37 rotates the worm wheel 50 by another 180° to move the drive lever 68 in the direction indicated by the arrow Y. Then, the slider 60 moves to the direction indicated by the arrow Y. As the result, the rotating shaft 55 is lowered to its lowest position and the video disc 15 which has been placed on the turntable 28 is now supported by the supporting members 31. In this condition, the first motor 45 stops driving the drive lever 68 to interrupt the reproducing operation.

The turntable 28 which vertically moves as abovementioned manner, takes the upper position where the video disc 15 is placed on the turntable 28 for the reproducing condition. The turntable 28 also takes the lower position where the video disc 15 is not placed on the turntable 28 for the nonreproducing condition. In other words, the reproducing or nonreproducing condition of the video disc player 10 may be confirmed according to the position of the turntable 28 or the slider 60.

As shown in FIG. 4, a locking mechanism 69 is mounted to the cover 11 described above. This locking mechanism 69 and the slider 60 are coupled with an interlocking rod 70. In the reproducing condition of the player 10, the locking mechanism 69 prevents the cover 11 from opening or keeps the cover 11 closed. In the nonreproducing condition of the player 10, the locking mechanism 69 allows the cover 11 to open. In other words, the cover 11 is pivotal freely in this state.

Referring to FIG. 4 again, in the housing 12 a loading mechanism 71 for automatically loading or unloading the casing 16 is arranged. The automatic loading mechanism 71 has a pair of rollers 721 and 722 which are rotatable about vertical axes. The rollers 721 and 722 are located at intermediate position of the guide rails 301 and 302, which are engageable with the outer side surfaces of the inserted casing 16, respectively. Worm wheels 731 and 732 are coaxially fixed to the upper ends of the rollers 721 and 722, respectively. Worms 741 and 742 are arranged to mesh with these worm wheels 731 and 732. The worms 741 and 742 are provided to both ends of a common interlocking rod 75, respectively. The interlocking rod 75 extends in the direction perpendicular to the loading direction of the casing as indicator by arrow X. A pulley 76 is coaxially fixed to the extreme end of the interlocking rod 75. A third reversible motor 77 is arranged below the roller 722 and fixed on the chassis 27, and has a rotating shaft extending parallel to the extending direction of the interlocking rod 75. A drive pulley (not shown) in coaxially mounted on the rotating shaft of the third motor 77. A belt 78 is stretched between the drive pulley and the pulley 76. The rollers 721 and 722 are rotated in the opposite directions by the third motor 77.

In the automatic loading mechanism 71 as described above, the casing 16 inserted through the insertion inlet 14 via the cover 11 reaches the positions intermediate the guide rails 301 and 302 where the rollers 721 and 722 are arranged. Then, detection switches (not shown) arranged at these positions are turned on. The third motor 77 thus drives the rollers 721 and 722 to automatically load the casing 16 inside the player 10. When the release of the casing 16 from the holding device 35 is detected by another detection switch (not shown), the third motor 77 rotates in the reverse direction and the rollers 721 and 722 carry back the casing until its front end reaches the intermediate positions of the guide rails 301 and 302.

A pair of mutually opposing bent segments 801 and 802 extend outward from the substantially intermediate position and the rear position, respectively, of the first auxiliary chassis 321. A columnar guide rod 81 arranged between the bent segments 801 and 802 extends along the insertion direction indicated by arrow X. A cartridge guide 82 is mounted on the guide rod 81 to be slidable in the direction indicated by arrow X. One end of the cartridge 33 is fixed to the cartridge guide 82, while the other end thereof rotatably engages with the upper surface of the second auxiliary chassis 322 through an anti-friction bearing 83. Thus, the cartridge 33 is radially moved above the turntable 28 in the opposite direction of the arrow X as the cartridge guide 82 moves.

Figure 10:
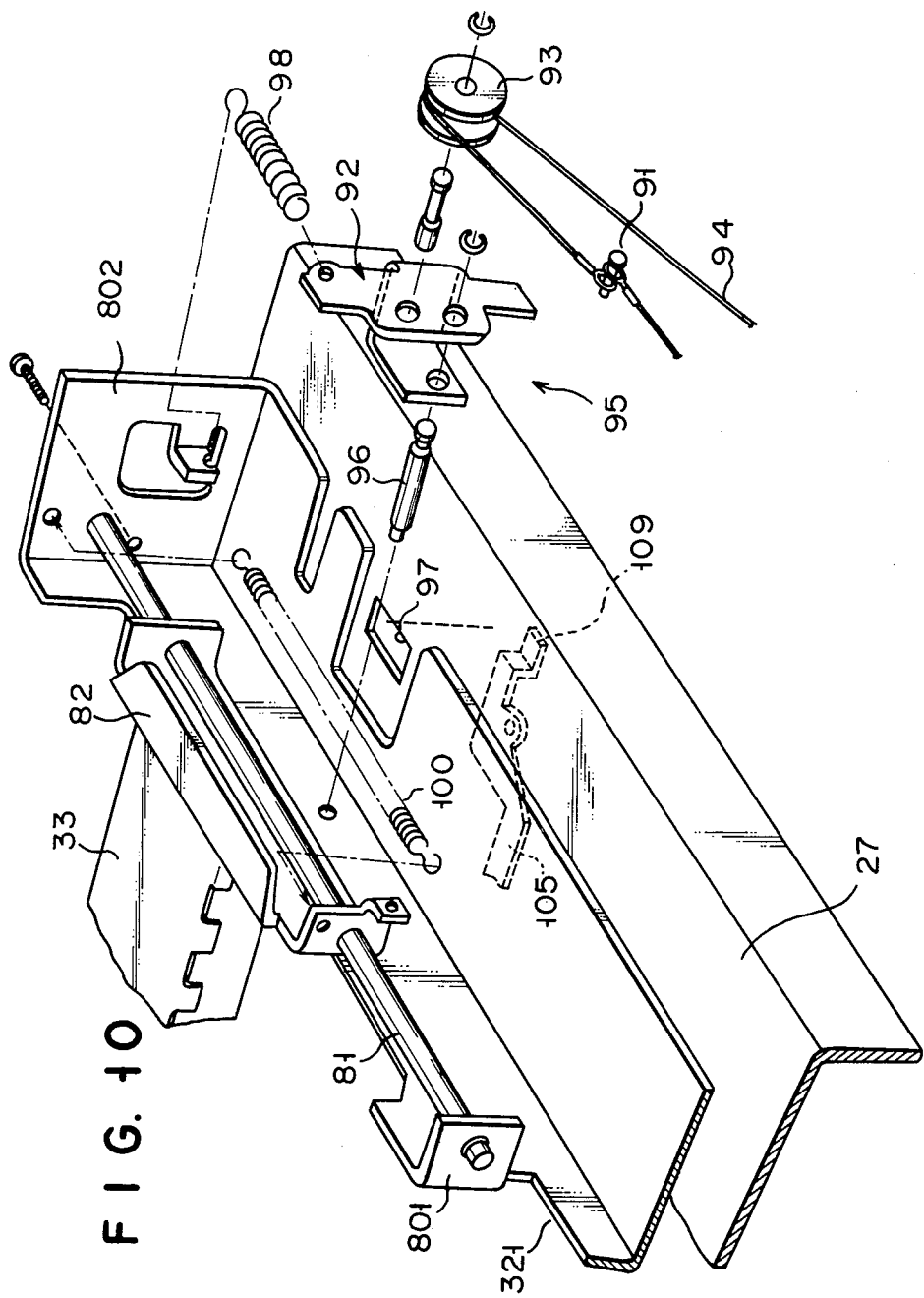
FIG. 10 is an exploded perspective view showing a third driving mechanism.

As shown in FIG. 10, a coil spring 100 is connected at one end to the cartridge guide 82 and at the other end to the rear bent segment 802. The coil spring 100 urges the cartridge guide 82 to a start position. The cartridge guide 82 is moved by the third drive mechanism 34 against the force of the coil spring 100, from the start position toward the central portion of the turntable 28. When the cartridge guide 82 is made freely movable, it is automatically turned to the start position from a given position by the urging force of the coil spring 100.

The third drive mechanism 34 for driving the cartridge 33 will now be described in detail.

The third drive mechanism 34 has a fourth motor 85 which, in turn, has a rotating shaft 84 rotating about a vertical axis. The fourth motor 85 is located on that portion of the first auxiliary chassis 321 which is rear of the insertion inlet 14. A worm 86 is mounted at that part of the auxiliary chassis 321 which is beyond the fourth motor 85 to be rotatable about a vertical axis. A belt 87 is wound around the rotating shaft 84 and the worm 86 so as to transmit the rotational force of the motor 85 to the worm 86 through the belt 87. A worm wheel 881 of large diameter is rotatably mounted on the auxiliary chassis 321 to engage with the worm 86, and has a rotating axis extending in the direction perpendicular to the direction indicated by arrow X. A first gear 882 of small diameter is coaxially mounted on the worm wheel 881. A second gear 89 of large diameter is rotatably mounted to the auxiliary chassis 321 to engage with the first gear 882 and has a rotating axis extending in the direction perpendicular to the direction indicated by arrow X. The second gear 89 is located at a fixed position. A first pulley 90 of small diameter is coaxially mounted to the second gear 89. With a reduction gear mechanism of this arrangement, the rotational force of the fourth motor 85 is transmitted to the first pulley 90.

An engaging pin 91 is fixed to the cartridge guide 82 to extend outward therefrom. A regulating plate 92 (shown in FIG. 10) to be described later is movably mounted at the innermost portion of the first auxiliary chassis 321. A second pulley 93 is rotatably mounted to the upper end of this regulating plate 92 in the same manner as the first pulley 90. A steel wire 94 as a driver is stretched between the first and second pulleys 90 and 93. The ends of the wire 94 engage with the engaging pin 91. When the regulating plate 92 is in a first position at which the wire 94 is kept taut, the rotational force of the fourth motor 85 is transmitted to the cartridge guide 82. As the rotating shaft 84 of the fourth motor 85 rotates, the cartridge 33 moves in the direction opposite to the direction indicated by arrow X. When the regulating plate 92 is in a second position at which the wire 94 is not taut, the rotational force of the fourth motor 85 is not transmitted to the cartridge guide 82. Therefore, even if the rotating shaft 84 of the motor 85 rotates, the cartridge 33 is not moved and the movement of the pickup arm 33 is not transmitted to the rotating shaft 84 of the motor 85. Thus, the cartirdge 33 is free to move.

Figure 12:
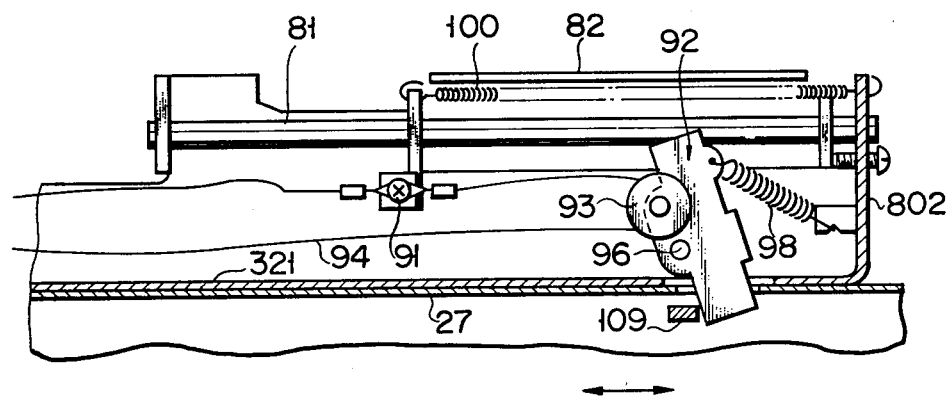

A transmission mechanism 95 which is the characteristic features of the present invention will now be described with reference to FIGS. 9 and 12.

The transmission mechanism 95 includes the regulating plate 92 described above. The regulating plate 92 is rotatably mounted, at its intermediate position, on the first auxiliary chassis 321 through a rotating shaft 96 as shown in FIG. 10. A through hole 97 is formed at that part of the chassis 27 which is located below the regulating plate 92. The lower end of the regulating plate 92 extends downward beyond the rear surface of the chassis 27 through the through hole 97.

Figure 11:
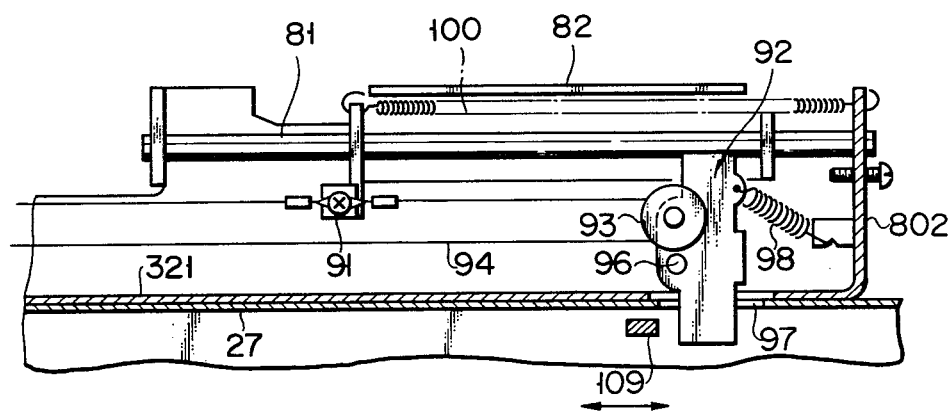
FIGS. 11 and 12 are side views side view of the third driving mechanism in the reproducing condition, and nonreproducing condition, respectively.

A coil spring 98 is provided between the upper end of the regulating plate 92 and the bent segment 802 of the first auxiliary chassis 321. The coil spring 98 biases the regulating plate 92 from the second position (as shown in FIG. 12) to the first position (FIG. 11). When no external force acts thereon, the regulating plate 92 is elastically held in its first position by the biasing force of the coil spring 98.

A support segment 99 projecting toward the first auxiliary chassis 321 is fixed to the inner side surface of the regulating plate 92 or the side surface of the regulating plate 92 facing the first auxiliary chassis 321.

The transmission mechanism 95 has a control mechanism 104 for controlling the pivoting position of the regulating plate 92, which is mounted on the under suface of the chassis 27 as shown in FIG. 9. This control mechanism 104 controls the movement of the regulating plate 92 to the first or second position according to the reproducing or nonreproducing condition of the video disc player 10. The control mechanism 104 has a control lever 105 which is pivotally mounted on the under surface of the chassis 27. The control lever 105 is pivotally mounted, at its intermediate position, on the under surface of the chassis 27 through a pivot pin 106. An elongate hole 107 is axially formed at one end of the control lever 105. One end of the control lever 105 crosses the drive lever 68 described above and is engaged with the driver lever 68 through an engaging pin 108 extending through the elongate hole 107. The other end of the control lever 105 extends so that it may be brought into contact with that side surface of the lower end of the regulating plate 92 which is facing to the insertion inlet 14. This other end of the control lever 105 is defined as an engaging portion 109.

When the first drive mechanism 37 moves the slider 60 to descend the turntable 28 toward the lower position, the engaging portion 109 regulates the position of the regulating plate 92 to the second position through the engagement of the drive lever 68 and the control lever 105. When the first drive mechanism 37 moves the slider 60 to ascend the turntable 28 toward the upper position, the engaging portion 109 regulates the position of the regulating plate 92 to the first position. In other words, when the player is in the reproducing condition, the regulating plate 92 is brought to the first position, and when the player is in the nonreproducing condition, the regulating plate 92 is brought to the second position.

The mode of operation of the transmission mechanism 95 will now be described with reference to the driving operations of the cartridge 33 and the turntable 28.

The reproducing operation of the player 10 is instructed in the condition wherein the disc 15 is mounted in the housing 12. The turntable 28 is moved upward through the first drive mechanism 37. The disc 15 is placed on the turntable 28, which is rotated through the second drive mechanism 38. The disc 15 is thus rotated. With the movement of the drive lever 68 for moving the turntable 28 upward, the control lever 105 pivots clockwise (FIG. 9) about the pivot pin 106. The engaging portion 109 of the control lever 105 is moved from the second position to the first position. The engaging portion 109 no longer contacts the lower part of the regulating plate 92, and the regulating plate 92 pivots clockwise by the biasing force of the coil spring 98. The steel wire 94 is then kept taut between the first and second pulleys 90 and 93. When the turntable 28 is thus located at the upper position, the driving force of the third drive mechanism 34 is transmitted to the cartridge guide 82.

Then, the fourth motor 85 of the third drive mechanism 34 is started to drive, and the cartridge 33 gradually moves from the start position in the direction opposite to the direction indicated by arrow X. When the stylus mounted on the cartridge 33 through a cantilever reaches the outer periphery of the recording portion on the disc 15, the stylus is lowered onto the surface of the disc 15 through a moving mechanism (not shown). Thus, the signals recorded on the disc 15 are reproduced.

The stylus of the cartridge 33 is slidably moved on the surface of the disc 15 through the third drive mechanism 34. When the stylus reaches the inner periphery of the recording portion on the disc 15, the stylus moves upward and is mounted within the cartridge 33. In this state, the second motor 38 is stopped rotating the turntable 28. The turntable 28 is moved downward through the first drive mechanism 37, and the player 10 is placed in the nonreproducing condition. Then, the disc 15 may be withdrawn from the housing 12.

When the drive lever 68 for lowering the turntable 28 moves in this nonreproducing condition of the player 10, the control lever 105 of the control mechanism 104 pivots counterclockwise (FIG. 9) about the pivot pin 106. The engaging portion 109 of the control lever 105 is thus moved from the first portion to the second position. Thus, the engaging portion 109 is brought into contact with the lower part of the regulating plate 92, and the regulating plate 92 pivots counterclockwise against the biasing force of the coil spring 98 to the second position. The steel wire 94 is not kept taut between the first and second pulleys 90 and 93. Therefore, when the turntable 28 is located at the lower position, the driving force of the third drive mechanism 34 is no longer transmitted to the cartridge guide 82, and the cartridge 82 is made freely movable. Thus, the cartridge guide 82 is returned to the start position by the urging force of the coil spring 100.

As mentioned above, the wire 94 remains taut as long as the turntable 28 lies at the upper position and the player 10 thus stays in the reproducing condition. Being taut, the wire 94 can transmit the driving force of the third drive mechanism 34 to the cartridge guide 82. The cartridge guide 82 can thus be moved by the third drive mechanism 34 while the player 10 is put in the producing condition. Conversely, the wire 94 is not taut when the turntable 28 lines at the lower position and the player 10 thus stays in the nonreproducing condition. Being not taut, the wire 94 cannot transmit the driving force of the third drive mechanism 34 to the cartridge guide 28. The cartridge guide 82 is thus free to move and automatically returned to the start position by the coil spring 100 when the player 10 stays in the nonreproducing condition.

Therefore, in the embodiment described above, the cartridge 33 is automatically returned to the start position by the urging force of the coil spring 100 when the player 10 comes out of the producing condition into the nonproducing condition. Urged by the coil spring 100, the cartridge 33 moves to the start position at a substantially constant speed. In this way the cartridge 33 smoothly returns to the start position, exerting no impact on the stylus. The stylus remains in good state even while the cartridge 33 is returning to the start position.

When the cartridge 33 reaches the start position, the urging force of the coil spring 100 still acts on the cartridge 33. The cartridge 33 therefore does not bounce at all and is thus held stable at the start position. Neither a mechanism nor a specially designed control circuit needs to be used for preventing the cartridge 33 from bouncing upon reaching the start position.

The cartridge 33 returns to the start position before the casing 16 is inserted into the player 10. It does not hinder the insertion of the casing 16. Much force is unnecessary to insert the casing 16 into the player 10, and the casing 16 can be inserted very smoothly.

Since the automatic return of the cartridge 33 is synchronized with the upward and downward movement of the turntable 28, the mechanism for making the cartridge 33 start returning is simple. The structure of the whole apparatus is therefore simple.

What is claimed is:

1. A disc reproducing apparatus into which a disc is inserted by insertion of a casing housing the disc therein and from which the disc is removed by insertion of an empty casing thereinto, said disc reproducing apparatus comprising:
a housing;
a turntable which is vertically movable in said housing;
turntable driving means for moving said turntable to an upper position in a reproducing condition and for moving said turntable to a lower position in a nonreproducing condition;
a cartridge which has a stylus for picking up signals recorded on said disc in the reproducing condition and which is movable between a reproduction start position and a reproduction end position;
cartridge driving means, with a motor, for driving said cartridge from the reproduction start position toward the reproduction end position, said cartridge driving means including a clutch means which transmits the driving force of said motor to said cartridge when said turntable is located at the upper position, and which does not transmit the driving force of said motor to said cartridge to render said cartridge free to move when said turntable is positioned at the lower position; and
urging means for urging said cartridge from the reproduction end position to the reproduction start position, whereby said cartridge is returned to the reproduction start position by the urging means when the turntable is positioned at the lower position, and wherein said clutch mechanism includes:
(a) a first pulley which is positioned at a fixed position and which is rotated by said motor;
(b) a regulating plate which is movable between a first position and a second position;
(c) a second pulley rotatably mounted on said regulating plate;
(d) an endless transmission member which is stretched between said first and second pulleys and part of which is fixed to said cartridge; and
(e) a control mechanism which moves said regulating plate to the first position at which said transmission member is kept tense to allow the movement of said cartridge through said transmission member upon rotation of said first pulley, when said turntable is located at the upper position, and which moves said regulating plate to the second position at which said transmission member is not tense to prohibit transmission of a rotational force of said first pulley to said cartridge through said transmission member, when said turntable is located at the lower position.

2. The disc reproducing apparatus according to claim 1, wherein said control mechanism includes:
a biasing member for biasing said regulating plate in a direction from the second position toward the first position; and
a control lever which is brought to a position to be disengaged from said regulating plate to elastically hold said regulating plate at the first position by a biasing force of said biasing member when said turntable is located at the upper position, and which is brought to a position to be engaged with said regulating plate to hold said regulating plate at the second position against the biasing force of said biasing member when said turntable is located at the lower position.

3. The disc reproducing apparatus according to claim 1 wherein said urging means includes a coil spring having one end connected to the cartridge and the other end connected to the housing.

* * * * *